United States Patent
Banerjee et al.

(10) Patent No.: US 9,109,517 B2
(45) Date of Patent: Aug. 18, 2015

(54) CONDITION MONITORING OF MECHANICAL DRIVE TRAIN COUPLED WITH ELECTRICAL MACHINES

(75) Inventors: Arijit Banerjee, Kolkata (IN); Rupam Mukherjee, Bangalore (IN); Arvind Kumar Tiwari, Bangalore (IN); Somakumar Ramachandrapanicker, Bangalore (IN); Srilatha Boyanapally, Bangalore (IN); Paul Lloyd Flynn, Fairview, PA (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 473 days.

(21) Appl. No.: 13/047,200

(22) Filed: Mar. 14, 2011

(65) Prior Publication Data

US 2012/0239348 A1    Sep. 20, 2012

(51) Int. Cl.
*G06F 11/30* (2006.01)
*F02D 29/06* (2006.01)
(Continued)

(52) U.S. Cl.
CPC .............. *F02D 29/06* (2013.01); *B60W 20/50* (2013.01); *F01D 15/10* (2013.01); *G01M 13/025* (2013.01); *G05B 23/0224* (2013.01); *H02P 21/148* (2013.01); *H02P 23/14* (2013.01);
(Continued)

(58) Field of Classification Search
CPC ..... G06F 19/00; G01R 31/343; H02P 21/148; H02P 23/14; H02P 29/021; F01D 15/10; F02D 29/06; F02D 2041/288; F02D 2041/1432; F02D 2200/1002; B60W 20/50; G01M 13/025; G05B 23/0224

USPC .......................................... 702/58, 182, 183
See application file for complete search history.

(56) References Cited

U.S. PATENT DOCUMENTS 6,590,362 B2    7/2003  Parlos et al.
6,756,757 B2 *  6/2004  Marcinkiewicz et al. .... 318/432
(Continued)

FOREIGN PATENT DOCUMENTS

EP    1541869 A1 *  6/2005  .............. F04B 49/10

OTHER PUBLICATIONS

B.M. Ebrahimi and J. Faiz, Diagnosis and performance analysis of three-phase permanent magnet synchronous motors with static, dynamic and mixed eccentricity, IET Electr. Power Appl., 2010 VOI4 Iss. 1, pp. 53-66.*

(Continued)

*Primary Examiner* — Eliseo Ramos Feliciano
*Assistant Examiner* — Yoshihisa Ishizuka
(74) *Attorney, Agent, or Firm* — GE Global Patent Operation; John A. Kramer (57) ABSTRACT

A method of monitoring health of a mechanical drive train is provided. The method includes obtaining voltage and current signals from at least one phase of an electrical machine coupled with the mechanical drive train. The method also includes representing the electrical machine having a non-sinusoidal flux distribution as a combination of a plurality of harmonic order sinusoidally distributed virtual electrical machines based on the obtained voltage and current signals. The method further includes determining a torque profile associated with one or more combinations of the sinusoidally distributed virtual electrical machines. Finally, the method includes detecting the presence of an anomaly in the mechanical drive train based on the torque profile or spectrum.

19 Claims, 9 Drawing Sheets (51) Int. Cl.
- *F01D 15/10* (2006.01)
- *G01M 13/02* (2006.01)
- *G05B 23/02* (2006.01)
- *H02P 21/14* (2006.01)
- *B60W 20/00* (2006.01)
- *H02P 23/14* (2006.01)
- *F02D 41/28* (2006.01)
- *F02D 41/14* (2006.01)
- *H02P 29/02* (2006.01)

(52) U.S. Cl.
CPC ... *F02D2041/1432* (2013.01); *F02D 2041/288* (2013.01); *F02D 2200/1002* (2013.01); *H02P 29/021* (2013.01)

(56) References Cited

U.S. PATENT DOCUMENTS

| | | |
|---|---|---|
| 7,024,335 B1 | 4/2006 | Parlos |
| 2010/0169030 A1 | 7/2010 | Parlos |

OTHER PUBLICATIONS

A. R. Mohanty, Fault Detection in a Multistage Gearbox by Demodulation of Motor Current Waveform., IEEE Transactions on Industrial Electronics., vol. 53, No. 4 Aug. 2006.*

Search Report and Written Opinion from corresponding PCT Application No. PCT/US2012/026433 dated Jul. 5, 2012.

Ebrahimi et al. "Diagnosis and performance analysis of three-phase permanent magnet synchronous motors with static, dynamic and mixed eccentricity", Volume. 4, No. 1, pp. 53-66, 1 Jan. 2010.

Martin Blödt, Jean Faucher, Bruno Dagues & Marie Chabert; "Mechanical Load Fault Detection in Induction Motors by Stator Current Time-Frequency Analysis"; Electric Machines and Drives, 2005 IEEE International Conference; May 2005; pp. 1881-1888.

Knight and Bertani; "Mechanical Fault Detection in a Medium-Sized Induction Motor Using Stator"; IEEE Transactions on Energy Conversion, vol. 20, No. 4, Dec. 2005; pp. 753-760.

Mohanty and Kar; "Fault Detection in a Multistage Gearbox by Demodulation of Motor Current Waveform"; IEEE Transactions on Industrial Electronics, vol. 53, No. 4, Aug. 2006; pp. 1285-1297.

A.Q. Flores, J.B. Carvalho, A.J.M. Cardoso; "Mechanical Fault Detection in an Elevator by Remote Monitoring"; Proceedings Ofthe 2008 International Conference on Electrical Machines; pp. 1-5.

Blödt et al.; "Distinguishing Load Torque Oscillations and Eccentricity Faults in Induction Motors Using Stator Current Wigner Distributions"; IEEE Transactions on Industry Applications, vol. 45, No. 6, Nov./Dec. 2009; pp. 1991-2000.

* cited by examiner

CONDITION MONITORING OF MECHANICAL DRIVE TRAIN COUPLED WITH ELECTRICAL MACHINES

BACKGROUND

The invention relates generally to condition monitoring and more particularly to a method and system of detecting an anomaly in a mechanical drive train coupled with electrical machines.

Typically, a power generation unit consists of a mechanical drive train and an electrical machine. Such electrical machine generally includes a generator or a motor that may be synchronous type or asynchronous type. Further, the mechanical drive train includes reciprocating engines, gas turbines, wind turbines or compressors. Generally, the mechanical drive trains are recognized with problems or anomalies during the operation. Non-limiting examples of such anomalies include a dead cylinder in a multiple cylinder reciprocating engine or a faulty cylinder that causes substantial fuel loss. Therefore, the health of such power generation unit is mostly monitored using multiple sensor system installed in the mechanical drive train. Currently, the sensor system includes dedicated sensors for measuring vibration, temperature and pressure for determining any anomalies in the mechanical drive train. Such sensor systems are prone to failures and require frequent maintenance. The sensors also require frequent calibration for sensing accurate measurements and further add complexity for carrying out the measurements for detecting the anomalies. Furthermore, such sensor systems involve additional cost to the power generation unit.

Accordingly, there is an ongoing need for improving upon accurately detecting anomalies in mechanical drive train of a power generation unit.

BRIEF DESCRIPTION

In accordance with an embodiment of the invention, a method of monitoring health of a mechanical drive train is provided. The method includes obtaining voltage and current signals from at least one phase of an electrical machine coupled with the mechanical drive train. The method also includes representing the electrical machine having a non-sinusoidal flux distribution as a combination of a plurality of harmonic order sinusoidally distributed virtual electrical machines based on the obtained voltage and current signals. The method further includes determining a torque profile associated with one or more combinations of the sinusoidally distributed virtual electrical machines. Finally, the method includes detecting the presence of an anomaly in the mechanical drive train based on the torque profile.

In accordance with an embodiment of the invention a system for monitoring health of a mechanical drive train is provided. The system includes a device module in communication to an electrical machine coupled to the mechanical drive train. The device module is configured to measure characteristics of the machine and includes a memory, wherein the memory includes instructions for obtaining voltage and current signals from at least one phase of an electrical machine coupled with the mechanical drive train, representing the electrical machine having a non-sinusoidal flux distribution as a combination of a plurality of harmonic order sinusoidally distributed virtual electrical machines based on the obtained voltage and current signals, determining a torque profile associated with one or more combination of the sinusoidally distributed virtual electrical machines and detecting the presence of an anomaly in the mechanical drive train based on the torque profile.

In accordance with an embodiment of the invention a method for monitoring health of a mechanical drive train is provided. The method includes obtaining voltage and current signals from at least one phase of an electrical machine coupled with the mechanical drive train and detecting the presence of an anomaly in the mechanical drive train based on an algebraic manipulation of the obtained voltage and current signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements. Any examples of operating parameters are not exclusive of other parameters of the disclosed embodiments.

Figure 1:
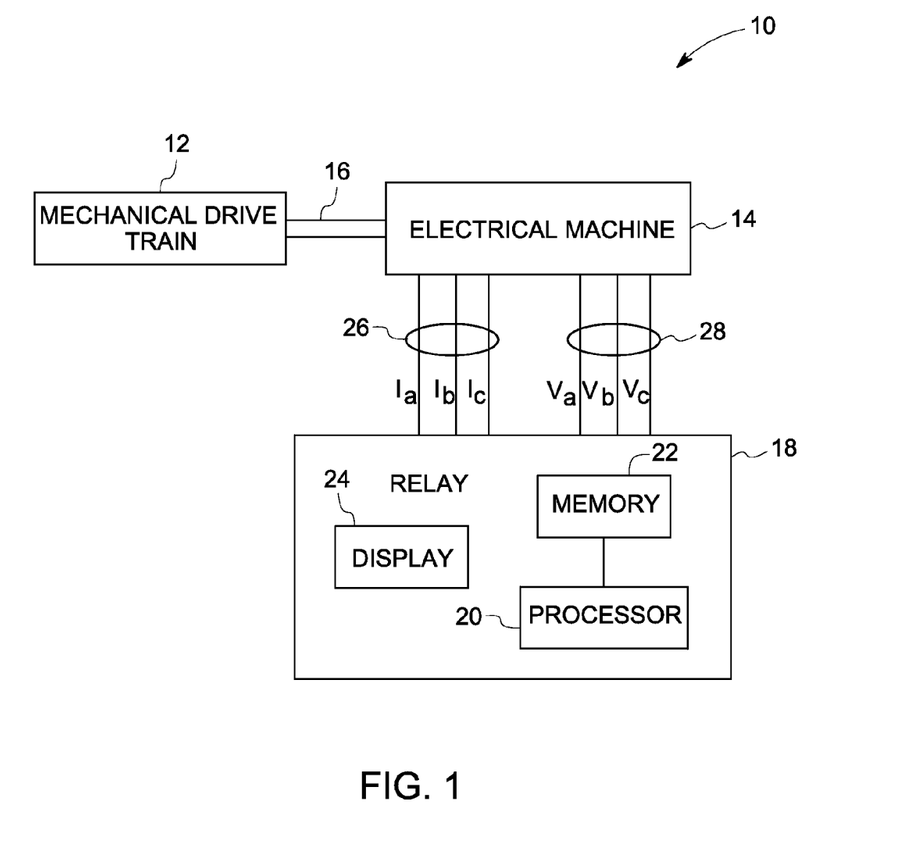
FIG. 1 is a block diagram of a system for determining an anomaly in a mechanical drive train of a power coversion unit in accordance with an embodiment of the present invention.

FIG. 1 is a block diagram of a system 10 for determining an anomaly in a mechanical drive train 12 of a power generation unit in accordance with an embodiment of the present invention. The system 10 includes an electrical machine 14 coupled to the mechanical drive train 12 through a shaft 16. Generally, the electrical machine 14 includes a generator or a motor that may be synchronous type or asynchronous type. In one embodiment, the mechanical drive train 12 includes a reciprocating engine with one or more cylinders that are fired using a specified firing order sequence. In another embodiment, the mechanical drive train 12 may also include a compressor, pump or any other mechanical system driven by a motor. In a non-limiting example, such power generation unit is used in a diesel locomotive, wherein the mechanical drive train is a 12-cylinder reciprocating diesel engine coupled to an electrical generator through a shaft. In another embodiment, the mechanical drive train 12 includes a pump. The electrical generator sends electrical power to traction motor located at each axle and powers the wheels of the diesel locomotive.

Further, to control and monitor the electrical machine 14, a device module 18, such as a relay, meter, or any other suitable device, is connected to the electrical machine 14. It should be appreciated that the device module 18 may include components of, or may be, a computer. For example, as depicted, the device module 18 includes a processor 20, a memory 22 and a display 24. The display 24 includes visual and/or audio display capability. The memory 22 includes any suitable volatile memory, non-volatile memory, or combination thereof. The memory 22 stores any parameters, algorithms, or other data for monitoring and controlling the power generation unit and further allows access to this data by the processor 24. It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the processor may be equipped with a combination of hardware and software for performing the tasks of the invention, as will be understood by those skilled in the art.

The device module 18 monitors various parameters of the electrical machine 14. In a non-limiting example, the device module 18 is connected to various monitoring components, such as sensors, transformers, etc., in the electrical machine 14. The monitoring components function to monitor current, voltage, or any other parameter. As indicated by lines 26, the device module 18 receives three-phase stator currents ($I_a$, $I_b$, $I_c$) from the electrical machine 14 connected to the mechanical drive train 12. Additionally, as indicated by lines 28, the device 18 receives three-phase stator voltages ($V_a$, $V_b$, $V_c$) from the electrical machine 14 connected to the mechanical drive train 12. It should be appreciated that various signal processing components may be included in the device module 18 or between the electrical machine 14 and the device module 18, such as signal conditioners, amplifiers, filters, etc. The device module 18 also includes a switching mechanism to control the operation of the power generation unit. As explained further below, the device module 18 may shutdown the mechanical drive train 12 via a switch in response to an anomaly.

Furthermore, the memory 22 of the device module 18 includes multiple instructions to execute a torque estimation algorithm for determining accurate values of torque and thereafter the anomaly in the mechanical drive train 12. In one embodiment, the instructions in the memory 24 include obtaining or receiving three-phase stator current signals 26 ($I_a$, $I_b$, and $I_c$) and the three-phase stator voltages 28 ($V_a$, $V_b$, and $V_c$) from the electrical machine 14 connected to the mechanical drive train 12 through a shaft 16. In another embodiment, the instructions include representing the electrical machine 14 having a non-sinusoidal flux distribution as a combination of multiple higher harmonic order sinusoidally distributed virtual electrical machines based on the obtained voltage and current signals. It is to be noted that the non-sinusoidal flux distribution in the electrical machine 14 are caused due to non ideal winding distributions in slots and teeth, saliency of poles, unbalanced power supply or load impedance connected to the stator terminals of the electrical machine or any geometric irregularities in the electrical machine 14. Generally, a torque estimation equation is given by $$T_e = \text{Im}\left[\frac{P}{2}\varphi_S I_S^*\right] \qquad (1)$$

where $I_S^*$ is a complex conjugate of a current vector $I_S$ and $\phi_S$ is the resultant flux linkage vector, which resultant flux linkage vector $\phi_S$ is further estimated from the stator voltages and the stator currents of the electrical machine 14 as $$\begin{aligned}\varphi_S &= \int [V_S - I_S R_S]dt \\ &= I_S L_S + \varphi_f.\end{aligned} \qquad (2)$$

where Vs is the stator voltage, $I_s$ is the stator current, $R_s$ is the electrical resistance, $L_s$ is the inductance of the stator circuit and $\phi_f$ is the flux linkage set up by the rotor MMF alone.

However, due to the non-sinusoidal flux distribution in the electrical machine 14, there are several harmonics in the flux linkage vector $_S$ and current vectors $I_S^*$ as;

$$\begin{aligned}\varphi_S &= |\varphi_S|e^{j\omega_e t} \\ &= \sum_n (\varphi_{fn} e^{jn\omega_e t} + I_n L_S e^{jn(\omega_e^* t + \alpha)})\end{aligned} \qquad (3)$$

$$I_S = \sum_n I_n e^{jn(\omega_e^* t + \alpha)} \qquad (4)$$

where $\omega_e^*$ is the electrical angular speed of each flux and current harmonic and $\alpha$ is the phase displacement of the current vector in relation to the other vectors. $\omega_e$ is the electrical angular speed of the resultant flux linkage vector. The flux linkage $\phi_f$ set up by the rotor MMF alone may be represented as $$\varphi_f = \sum_n (\varphi_{fn} e^{jn\omega_e^* t})$$

Figure 2:
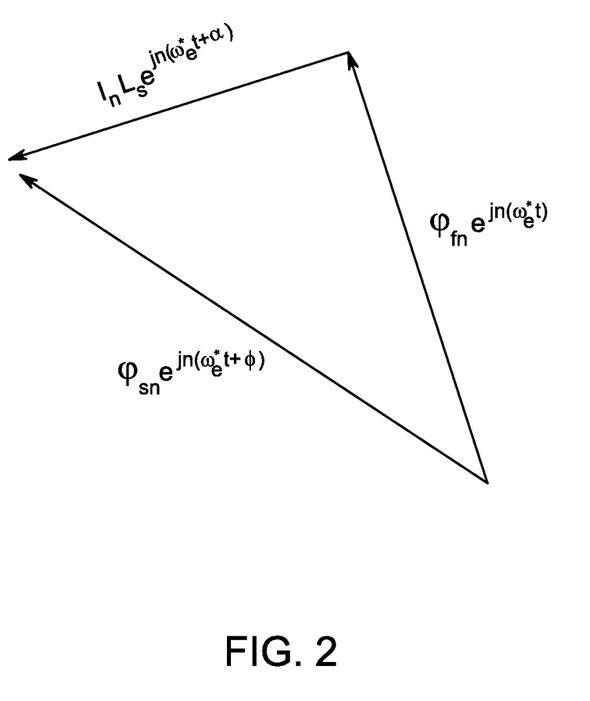
FIG. 2 shows nth harmonic flux linkage vectors setup by non-sinusoidally distributed electrical machine in accordance with an embodiment of the present invention.

Thus, in general, the nth harmonic flux linkage vectors set up by the non-sinusoidal electrical machine can be represented as in FIG. 2. Therefore, it is clear that the nth harmonic stator flux linkage $\phi_{Sn}$ rotates with electrical angular speed $n\omega_e^*$ just as the nth harmonic flux linkage set up by the rotor $\phi_{fn}$.

Interaction of the harmonics of the current and flux create ripple components in the estimated torque, which are computed inaccurately by the current traditional methods. Therefore, the present invention includes concept of multiple virtual machines to overcome this problem as shown in FIG. 3.

Figure 3:
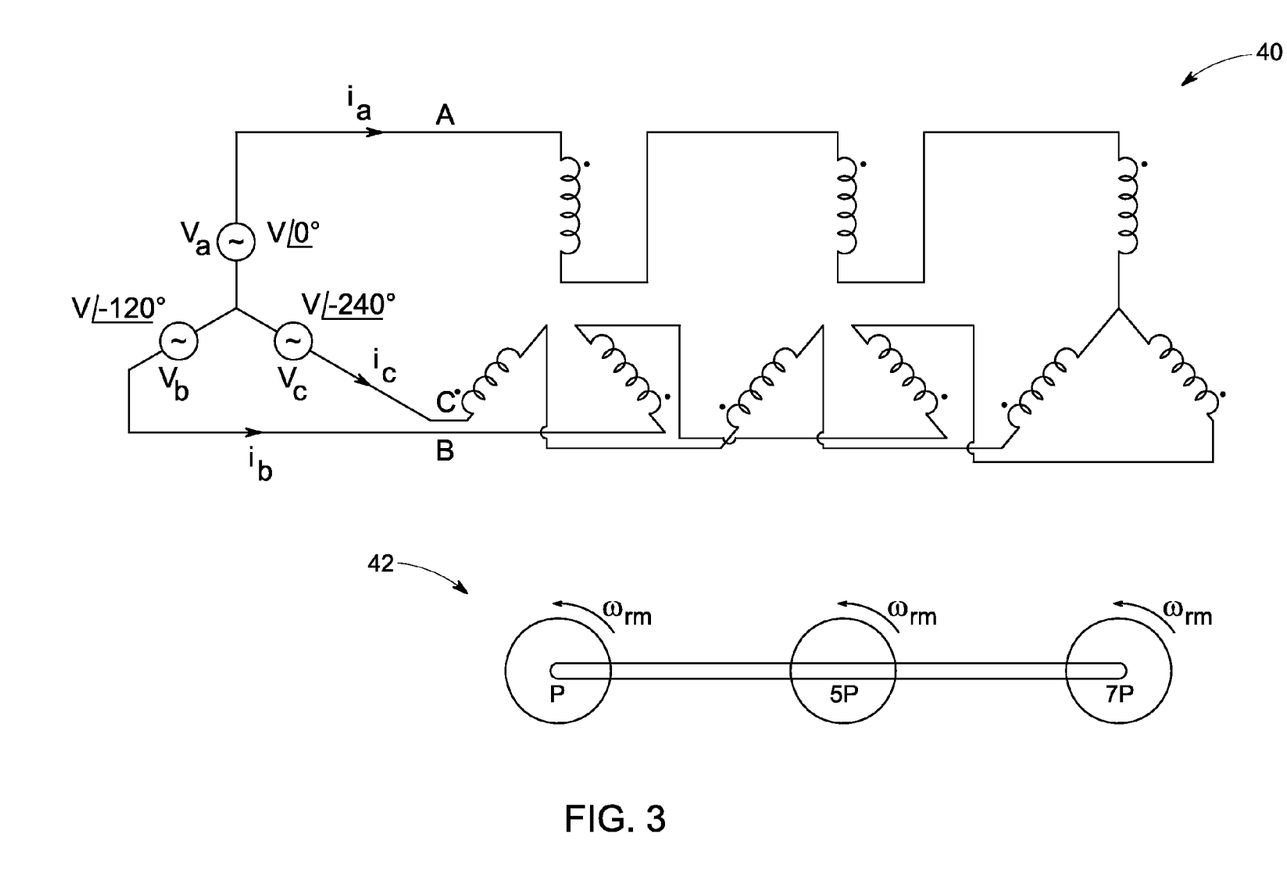
FIG. 3 is a representation of the multiple virtual electrical machines having various instantaneous speeds connected on a same shaft in accordance with an embodiment of the present invention.

FIG. 3 shows a representation 40 of the harmonic order sinusoidally distributed multiple virtual electrical machines 42 connected on the same shaft and having different number of poles in accordance with an embodiment of the invention. The rotors of the multiple virtual electrical machines rotate with the same mechanical speed $\omega_m$ but produce flux linkage vectors with different electrical angular speeds $\omega_e^*$, $5\omega_e^*$, $7\omega_e^*$ . . . etc. The angular speed $\omega_e$ is the instantaneous speed of the resultant flux linkage vector observed from the terminals, the angular speed $\omega_m$ is the instantaneous mechanical speed of the shaft to which all the virtual machines are connected and the angular speed $\omega_e^*$ is the instantaneous speed of the flux linkage vector produced by the fundamental virtual machine and is related to $\omega_m$ as $$\omega_e^* = \frac{P}{2}\omega_m \qquad (3)$$

where P is the number of poles of the electrical machine.

Figure 4:
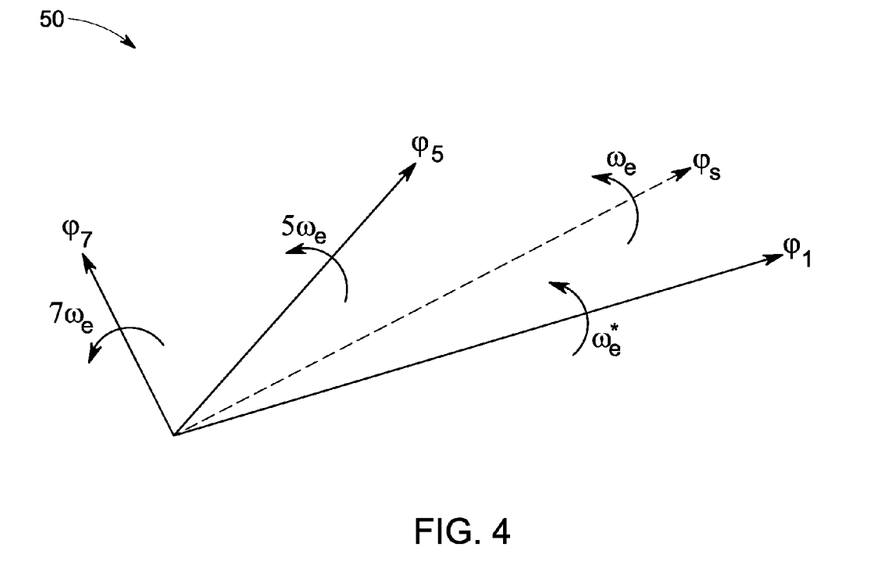
FIG. 4 shows the different harmonic flux linkage vectors rotating with different electrical angular speeds in accordance with an embodiment of the present invention.

Hence, a first method of determining the mechanical torque $T_m$ on the shaft may be expressed as $$T_m = \frac{P_{in}}{\omega_m}$$
$$= \frac{P}{2}\left[\frac{\text{Re}(V_S I_S^*)}{\omega_e^*}\right]$$

where, $P_{in}$ is the input power and Re is the real part of the multiplied $V_S$ and $I_S^*$. At every instant, $\omega_e^*$ may be evaluated by resolving the resultant flux linkage vector observed at the terminals into several harmonics rotating at corresponding harmonic speeds as shown in a representation 50 of FIG. 4. This resolution can be done using the information of the ratio of the amplitudes of $\phi_{fn}$ for different values of n. This information can be extracted by taking the ratio of the harmonic voltages at the stator terminals during open circuit condition.

Figure 5:
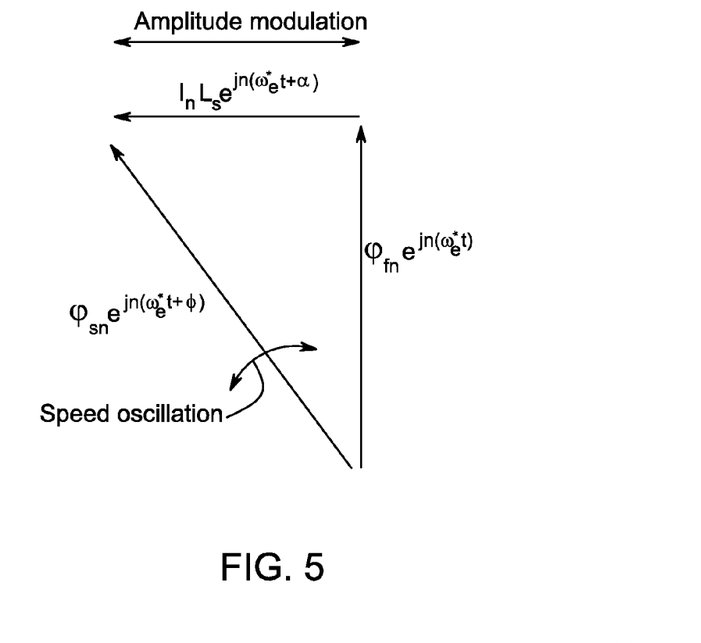
FIG. 5 shows amplitude modulation due to load torque pulsations leading to oscillations in electrical angular speed of stator flux linkage vector in a non-sinusoidally distributed electrical machine in accordance with an embodiment of the present invention.

It is to be noted that the non-sinusoidal flux distribution in the electrical machine 14 (shown in FIG. 1) is also caused due to load pulsations imposed by the mechanical drive train 12. Due to load pulsations, each harmonic of the flux linkage vector is amplitude modulated. Assuming that the mechanical angular velocity of the rotor is constant at $\omega_m$, side bands appear on either side of the fundamental frequency component in the resultant flux spectrum. Thus, the electrical angular velocity of the nth harmonic stator flux linkage $\phi_{Sn}$ is no longer $n\omega_e^*$. This phenomenon is explained in FIG. 5. Hence, in order to compute a correct instantaneous speed of the flux linkage vector $\omega_e^*$, the fundamental frequency component of the flux linkage is considered.

Furthermore, the determination of the accurate instantaneous speed $\omega_e^*$ includes firstly taking a fast fourier transform (FFT) of a real or imaginary part of the resultant flux linkage vector $\phi_S$. Secondly, since all the harmonics have the similar amplitude modulation pattern, any nth order harmonic is selected and the side bands are rejected as shown in a representation 60 of FIG. 6, wherein the harmonic 62 is selected and rest of the side bands are rejected. Thirdly, all the remaining frequencies are considered zero and a time domain vector is reconstructed from the modified FFT. Finally, the speed of the resulting vector is considered as the accurate estimate of the corresponding instantaneous speed $n\omega_e^*$. The speed of each virtual machine is thus extracted using the input power $P_{in}$ to determine accurate values of torque corresponding to each of the virtual machines.

In another method of determining the accurate electrical speed $\omega_e^*$, firstly, the flux linkage $\phi_f$ setup by the rotor MMF is determined by $$\phi_f = \phi_S - I_S L_S.$$

Figure 6:
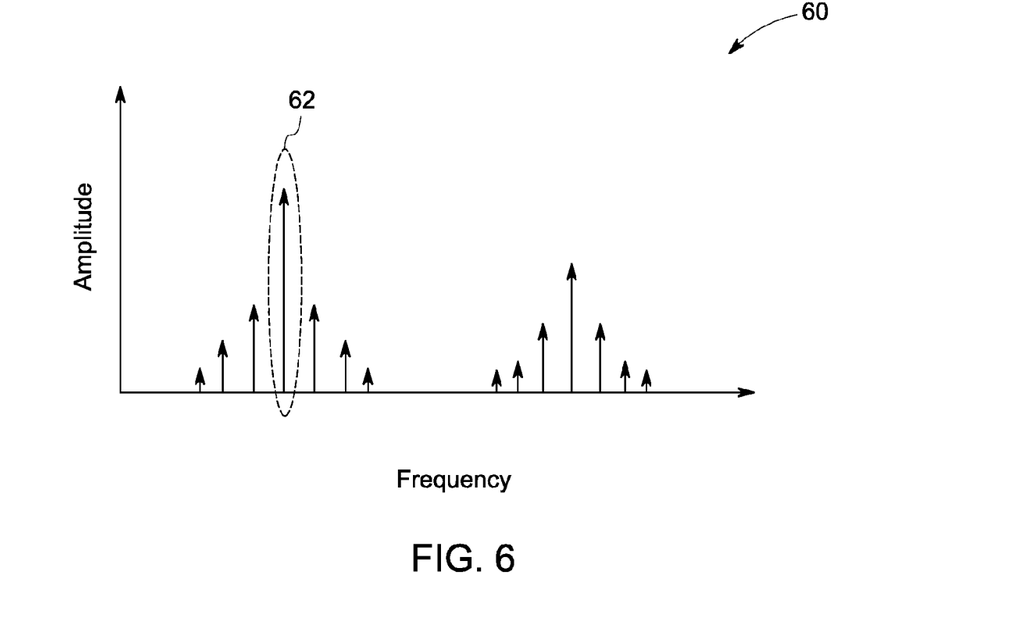
FIG. 6 shows a fundamental harmonic identified from a frequency spectrum of an estimated torque to further estimate accurate electrical angular speed $\omega_e^*$ in accordance with an embodiment of the present invention.

Secondly, FFT is taken and any nth harmonic is extracted, considering all the other frequencies as zero similar to the method described in FIG. 6. The time domain vector is then reconstructed and its speed is considered as the accurate estimate of the corresponding electrical speed $n\omega_e^*$. The speed of each virtual machine is thus extracted to determine the torque form the input power $P_{in}$.

In a second method of estimating torque, individual torque profiles are estimated for each of the harmonic electrical machines. As shown in FIG. 3, the nth order machine has number of poles nP. Thus the total torque is composed out of the individual torque profiles as $$T_m = \sum_n T_{mn}$$
$$= \text{Im}\left[\frac{P}{2}\left(\sum_n n\varphi_{fn}\right)I_S^*\right]$$

In one embodiment, the instructions in the memory 24 (shown in FIG. 1) include determining a torque profile associated with one or more combinations of the sinusoidally distributed virtual electrical machines. In order to determine the torque profile accurately, the instructions further include determining a first torque profile associated with a fundamental sinusoidally distributed virtual electrical machine. The instructions also include determining a second torque profile associated with a second harmonic order sinusoidally distributed virtual electrical machine and similarly includes determining a plurality of subsequent torque profiles associated with subsequent harmonic order sinusoidally distributed virtual electrical machines. Further the instructions include combining the first torque profile, the second torque profile and the subsequent torque profiles to generate the torque profile accurately. Finally, the system 10 (shown in FIG. 1) detects the anomaly in the mechanical drive train by comparing the torque profile with a set of expected torque profiles based on a malfunction in one or more components of the mechanical drive train. In one embodiment, the method of detecting the anomaly includes determining the presence of a dead cylinder using information of the firing sequence of the engine or the presence of a fault cylinder having substantial fuel loss.

Figure 7:
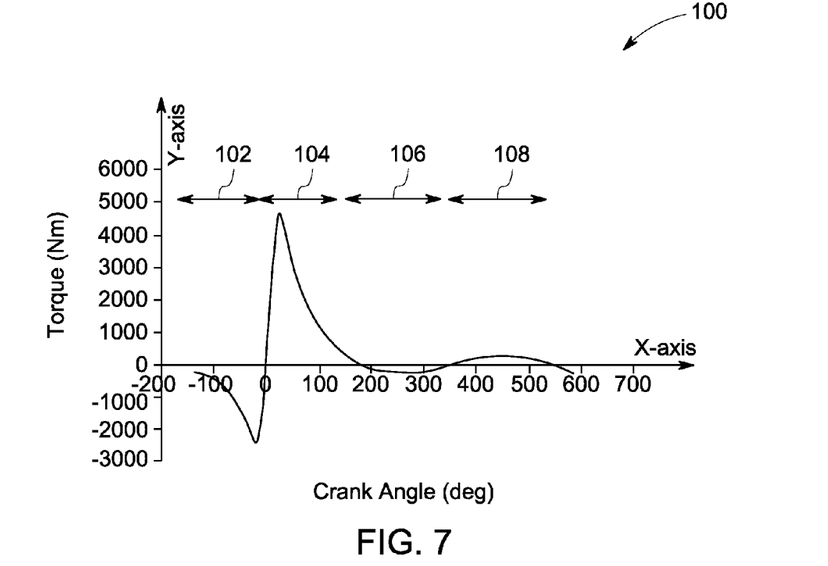
FIG. 7 shows a non-limiting example of a torque profile generated for a single cylinder reciprocating engine connected to an electrical machine in accordance with an embodiment of the present invention.

A non-limiting example of a torque profile 100 generated for a single cylinder reciprocating engine (prime mover) connected to an electrical machine is shown in FIG. 7. The y-axis of the plot depicts torque in newton-meter units. The x-axis of the plot represents crank angle of the engine cylinder in rotational degree units. The torque profile 100 shows multiple phases (compression 102, power stroke 104, exhaust 106, inlet 108) of a complete cycle of rotation of the single cylinder reciprocating engine.

Figure 8:
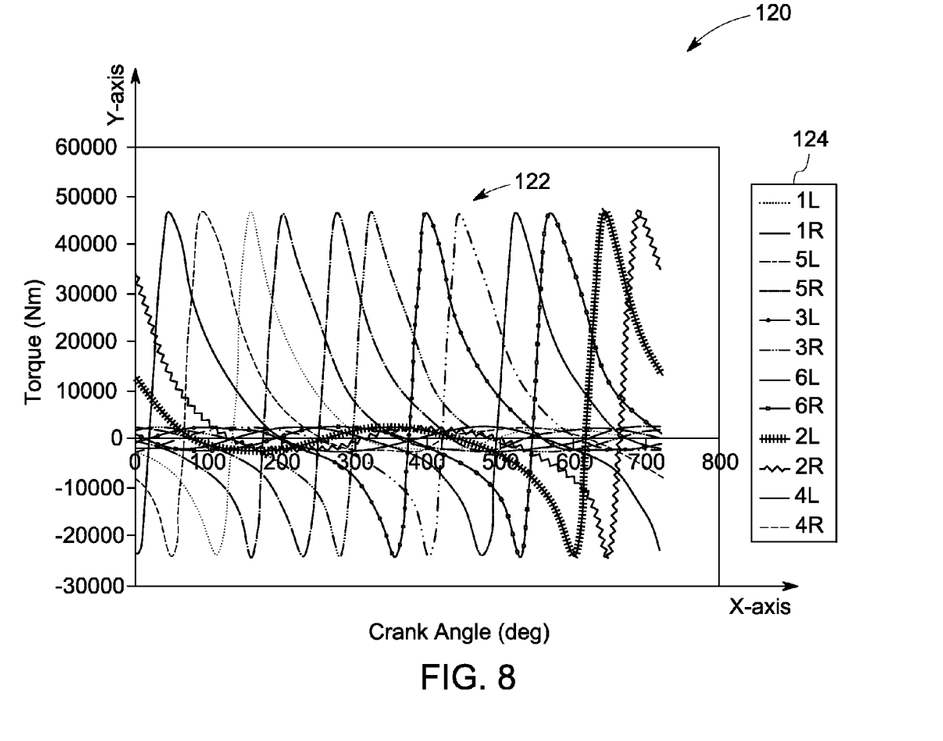
FIG. 8 shows a non-limiting example of a representation of a superimposition of multiple cylinder torque profiles in accordance with an embodiment of the present invention.

Similarly, FIG. 8 shows a non-limiting example of a representation 120 of a superimposition of multiple cylinder torque profiles 122. The y-axis of the plot depicts torque in newton-meter units. The x-axis of the plot represents crank angle of the engine cylinder in rotational degree units. The torque profiles 122 clearly show the sequence of firing of corresponding multiple engine cylinders of the mechanical drive train. In this embodiment, the firing sequence information 124 is given for the mechanical drive train (12 cylinder reciprocating engine) for minimizing vibration and achieving smooth running, for long engine fatigue life.

Figure 9:
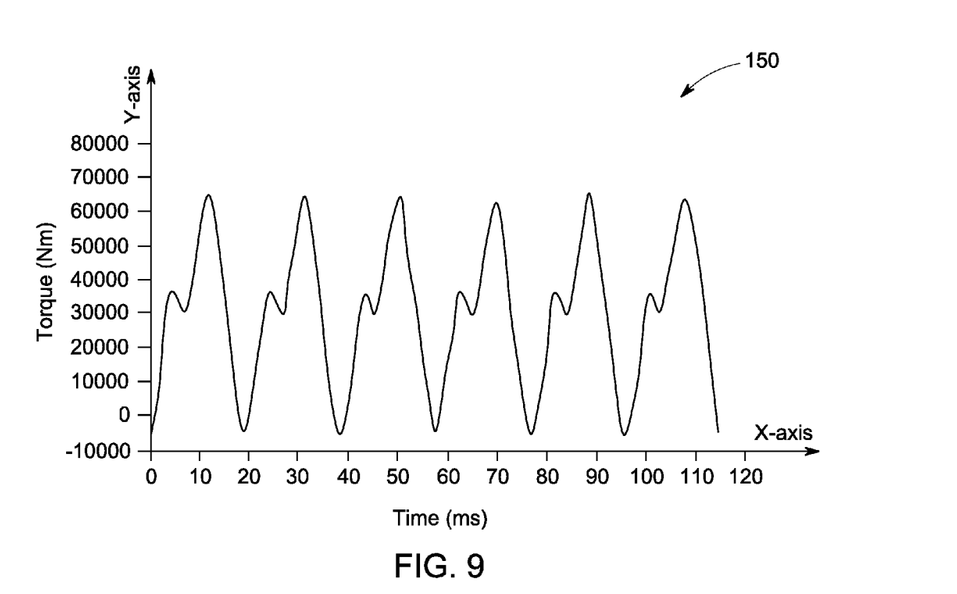
FIG. 9 shows a non-limiting example of a resultant torque profile of a non-faulty multiple cylinders reciprocating engine running according to a given firing sequence in accordance with an embodiment of the present invention.
Figure 10:
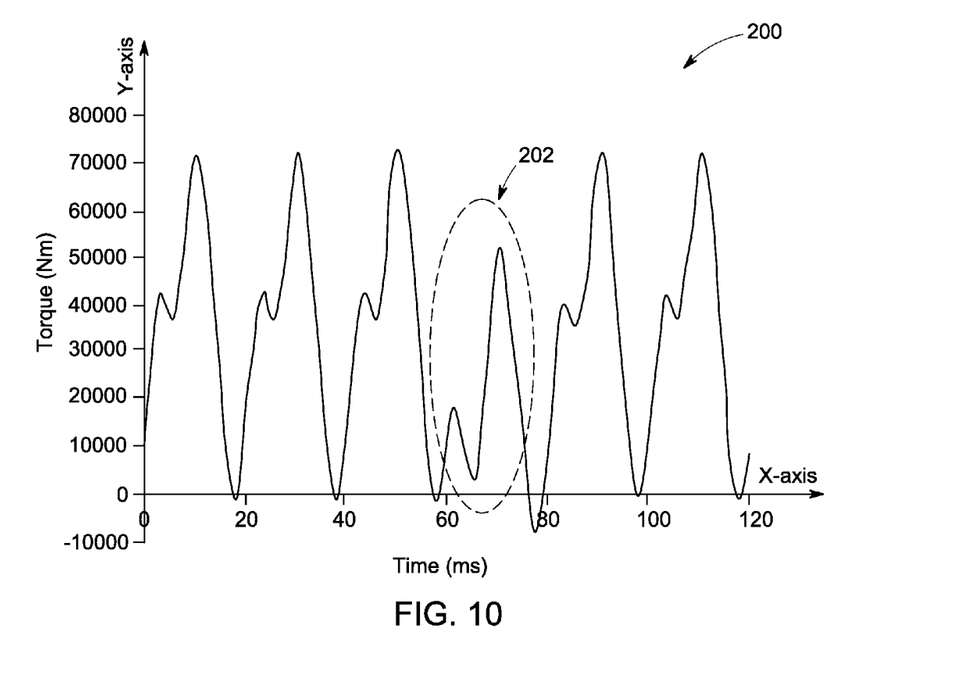
FIG. 10 shows another non-limiting example of a torque profile of a faulty multiple cylinders reciprocating engine running according to a given firing sequence.

Further, FIG. 9 shows a non-limiting example of a resultant torque profile 150 of a non-faulty multiple cylinder reciprocating engine running according to a given firing sequence. The y-axis of the plot depicts torque in newton-meter units. The x-axis of the plot represents time in second units. FIG. 10 shows another non-limiting example of a torque profile 200 of a faulty multiple cylinder reciprocating engine running according to a given firing sequence. The torque profile shows a fault 202 in one of the engine cylinder. As discussed, such a fault may include a dead cylinder or a fuel loss of a faulty cylinder of the reciprocating engine. Such a fault leads to a prominent set of harmonics in the torque spectrum in a sequence as:

$$\frac{\omega_{rm}}{N}, 2\frac{\omega_{rm}}{N}, \ldots 3\frac{\omega_{rm}}{N}, \omega_{rm}, \ldots$$

where, N is the number of cylinders and $\omega_{rm}$ is the mechanical rotational speed of the engine. This further results in a fundamental fault frequency. It is to be noted that torque harmonics comes at all multiples of ½ the operating speed of a four stroke engine and all multiples of the operating speed for a two stroke engine.

In one embodiment, the processor 20 (shown in FIG. 1) computes a fundamental fault frequency in the torque profile for the faulty engine using the information of the number of revolutions of the mechanical drive train for a complete firing of all the cylinders. The system 10 (shown in FIG. 1) also determines the presence and magnitude of side band frequency components in the torque spectrum around the fundamental fault frequency at intervals of the computed fundamental fault frequency. The magnitude of the side band frequency is indicative of the severity of the anomaly. Further, the system 10 (shown in FIG. 1) includes detecting the anomaly by filtering the third torque profile to extract the magnitude of the computed fundamental fault frequency. Further the faulty engine cylinder is identified using phase information extracted from the filtered torque profile.

Figure 11:
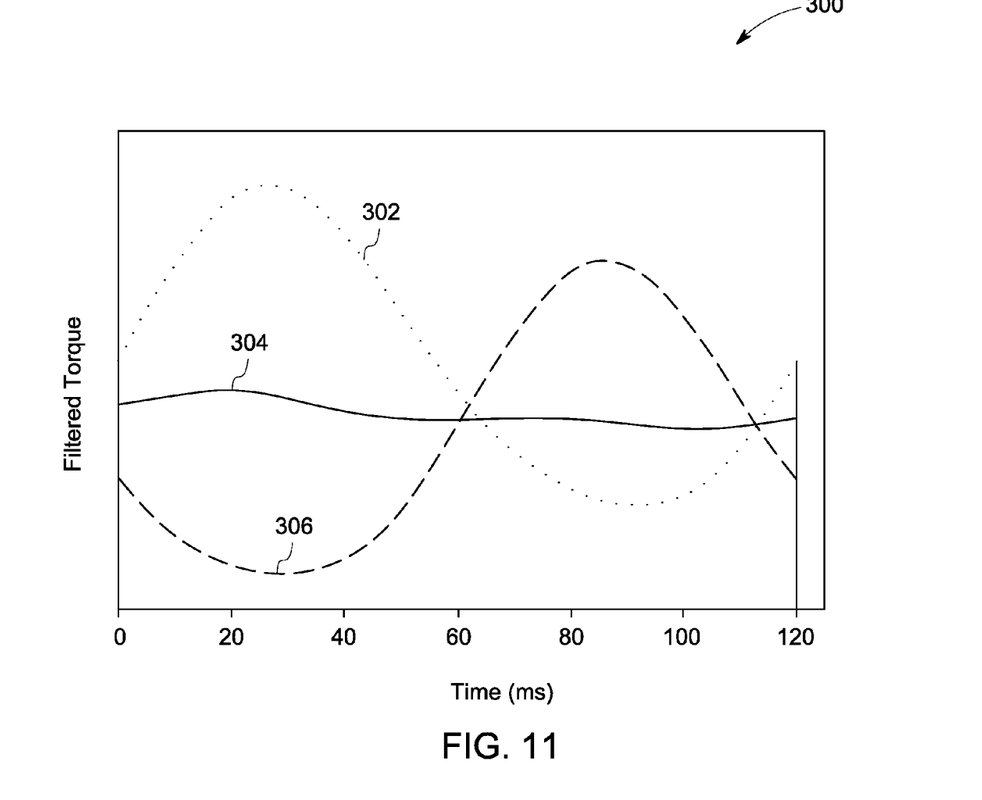
FIG. 11 shows a non-limiting example of a filtered torque profile depicting a phase information of a driving end and non-driving end of a faulty cylinder.

FIG. 11 shows a non-limiting example of a filtered torque profile 300 depicting a phase information of a driving end faulty cylinder 302 and a non-driving end of faulty cylinder 304. As shown, the characteristics information of the peak values of the torque profile corresponding to the driving end faulty (cut off cylinder) cylinder 302 is captured at the corresponding time instant. By using this time information and mapping with the firing sequence information of the mechanical prime mover, the faulty cylinder is determined. Similarly, the non-driving end faulty cylinder 304 waveform exhibits a shift of about 180 degrees in relation to the drive end faulty cylinder 302 waveform by virtue of the time delay incurred in the firing order sequence of the mechanical drive train. If any other cylinder is faulty, there will be some other phase shift, which can be uniquely mapped to the location of the faulty cylinder.

Figure 12:
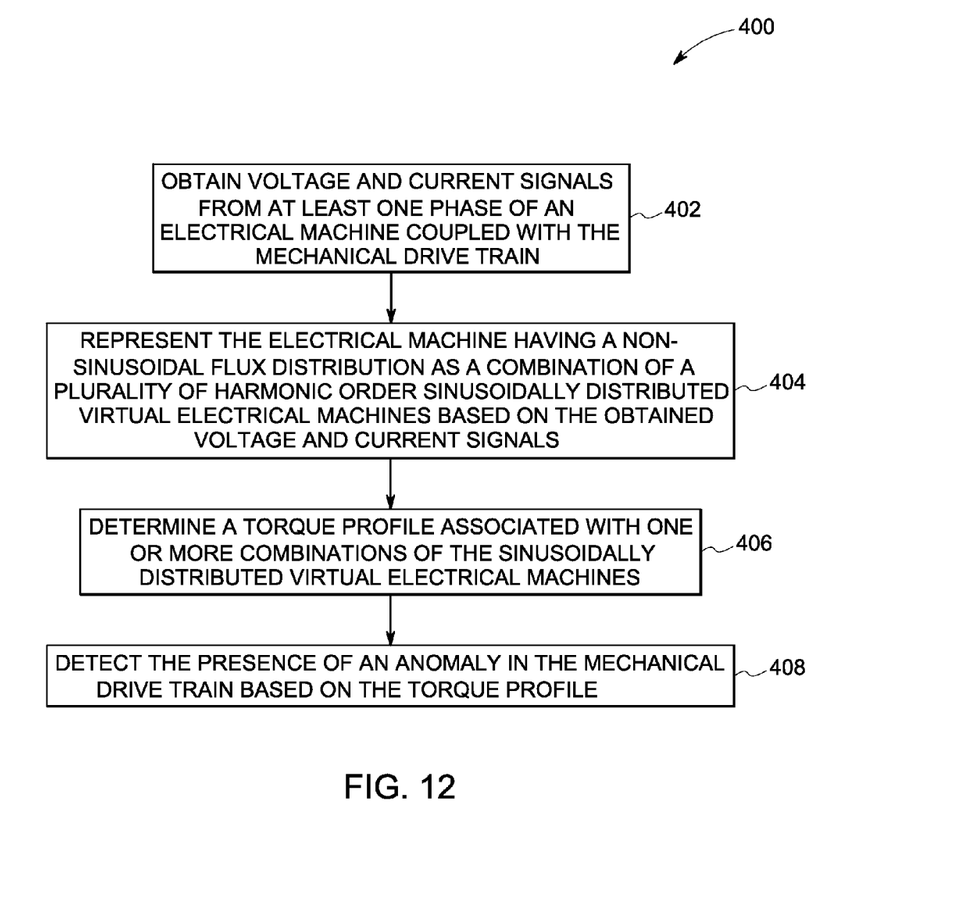
FIG. 12 is a flow chart of a method 400 of monitoring health of a mechanical drive train in a power generation unit in accordance with an embodiment of the present invention.

FIG. 12 is a flow chart of a method 400 of monitoring health of a mechanical drive train in a power conversion unit. The method includes obtaining voltage and current signals from at least one phase of an electrical machine coupled with the mechanical drive train at step 402. The method also includes representing the electrical machine having a non-sinusoidal flux distribution as a combination of a plurality of harmonic order sinusoidally distributed virtual electrical machines based on the obtained voltage and current signals at step 404. Further, at step 406 the method includes determining a torque profile associated with one or more combinations of the sinusoidally distributed virtual electrical machines. The accurate determination of the torque profile includes further steps of determining a first torque profile associated with a fundamental sinusoidally distributed virtual electrical machine. Furthermore, the method also includes determining a second torque profile associated with a second harmonic order sinusoidally distributed virtual electrical machine and similarly includes determining a plurality of subsequent torque profiles associated with subsequent harmonic order sinusoidally distributed virtual electrical machines. The torque profile as discussed in step 406, is finally generated by combining the first torque profile, the second torque profile and the subsequent torque profiles.

Finally at step 408, the method includes detecting the presence of an anomaly in the mechanical drive train based on the torque profile. Detecting the presence of the anomaly in the mechanical drive train further includes estimating a frequency spectrum from the torque profile, determining a magnitude and a phase of the multiple frequency components in the torque spectrum and comparing the frequency spectrum with an expected spectrum from a healthy drive train to determine nature of the fault or anomaly. It is to be noted that the magnitude of multiple frequency components in the torque spectrum is indicative of the severity of the anomaly of the mechanical drive train, whereas the phase of the multiple frequency components in the torque spectrum is indicative of the location of the anomaly of the mechanical drive train. The method step finally includes extracting the frequency components in time by appropriate filtering of the toque spectrum.

Advantageously, the present method and system enables the processing of information from an electrical machine for rapidly and easily detecting anomalies in a mechanical drive train such as a dead cylinder, fuel loss in a faulty cylinder, etc. Further, the above-mentioned algorithm, when employed with various computer(s) and/or machines, provides an on line monitoring capability of asset (e.g., reciprocating engine) and allows the user to plan in advance the shutdown process and maintenance of reciprocating engine with faulty cylinders as anomalies.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of monitoring health of a mechanical drive train, the method comprising:
    obtaining voltage and current signals from at least one phase of an electrical machine coupled with the mechanical drive train, wherein the electrical machine has a non-sinusoidal distribution of flux in the electrical machine;
    determining a first torque profile or spectrum of the mechanical drive train from the voltage and current signals that are obtained, the first torque profile or spectrum formed from a combination of plural harmonic order sinusoidal distributions of flux in plural virtual electric machines and representative of torques generated by the mechanical drive train, the plural harmonic order sinusoidal distributions of flux in the virtual electric machines and the non-sinusoidal distribution of flux in the electrical machine determined from the voltage and current signals that are obtained; and
    detecting presence of an anomaly in the mechanical drive train based on the first torque profile or spectrum,
    responsive to detecting the presence of the anomaly advancing a shutdown process or maintenance of the electrical machine,
    wherein the harmonic order sinusoidal distributions of flux represent distributions of flux in the virtual electric machines that are connected to a common shaft,
    wherein each of the virtual electric machines has a different respective number of poles, each of the virtual electric machines has a rotor rotating at a common speed as rotors of the other virtual electric machines, and
    wherein the virtual electric machines produce flux linkage vectors having different respective electrical angular speeds.

2. The method of claim 1, wherein the anomaly is detected by comparing the first torque profile or spectrum with a set of expected torque profiles or spectra based on a malfunction in one or more components of the mechanical drive train.

3. The method of claim 1, further comprising:
    determining a second torque profile or spectrum associated with a first sinusoidal distribution of flux in the plural harmonic order sinusoidal distributions of flux in the virtual electric machines;
    determining a third torque profile or spectrum associated with a second harmonic order of a sinusoidal distribution of flux in the plural harmonic order sinusoidal distributions of flux in the virtual electric machines;
    determining a plurality of subsequent torque profiles or spectra associated with subsequent harmonic order sinusoidal distributions of flux in the plural harmonic order sinusoidal distributions of flux in the virtual electric machines; and
    combining the second torque profile or spectrum, the third torque profile or spectrum, and the plurality of subsequent torque profiles or spectra to generate the first torque profile or spectrum.

4. The method of claim 1, wherein the non-sinusoidal distribution of flux in the electrical machine is caused due to at least one of a geometric irregularity in the electrical machine, non-ideal winding distributions in slots of the electrical machine, non-ideal winding distributions in teeth of the electrical machine, saliency of poles of the electrical machine, an unbalanced power supply of the electrical machine, or a load impedance connected to stator terminals of the electrical machine.

5. The method of claim 1, wherein the non-sinusoidal distribution of flux in the electrical machine is caused due to pulsations imposed by the mechanical drive train connected to the electrical machine.

6. The method of claim 1, further comprising measuring a plurality of machine parameters from the electrical machine, wherein the machine parameters comprise stator inductance, stator resistance, and leakage inductance.

7. The method of claim 1, wherein the first torque profile represents torque generated by the mechanical drive train as a function of crank angle in one or more cylinders of the mechanical drive train.

8. The method of claim 1, further comprising determining angular speeds of the harmonic order sinusoidal distributions of flux in the virtual electrical machines.

9. The method of claim 8, wherein the presence of the anomaly in the mechanical drive train is detected based on an input power and one or more of the angular speeds of the virtual electrical machines.

10. The method of claim 1, wherein the mechanical drive train comprises a plurality of periodicity and a plurality of frequency components associated with the anomaly in one or more components of the mechanical drive train.

11. The method of claim 10, wherein the anomaly is detected in the mechanical drive train based on the plurality of periodicity and the plurality of frequency components.

12. The method of claim 11, wherein detecting the presence of the anomaly further comprises extracting the frequency components in time by filtering of the first torque profile or spectrum.

13. The method of claim 11, wherein the frequency components are computed using information of a plurality of periodicity of malfunctions in one or more components of the mechanical drive train.

14. The method of claim 11, wherein detecting the presence of the anomaly in the mechanical drive train further comprises:
    estimating a frequency spectrum from the first torque profile or spectrum;
    determining a magnitude and a phase of the plurality of frequency components in the first torque profile or spectrum; and
    comparing the frequency spectrum with an expected spectrum from a drive train that does not include the anomaly in order to determine the anomaly.

15. The method of claim 14, wherein the magnitude of the plurality of frequency components in the first torque profile or spectrum is indicative of a severity of the anomaly of the mechanical drive train.

16. The method of claim 14, wherein the phase of the plurality of the frequency components in the first torque profile or spectrum is indicative of a location of the anomaly in the mechanical drive train.

17. A system for monitoring health of a mechanical drive train, the system comprising:
- a device module in communication with an electrical machine that is coupled to the mechanical drive train, the device module configured to measure characteristics of the first electrical machine, the device module comprising a memory having instructions for:
- obtaining voltage and current signals from at least one phase of the electrical machine coupled with the mechanical drive train, the electrical machine having a non-sinusoidal distribution of flux in the electrical machine;
- determining a first torque profile or spectrum of the mechanical drive train from the voltage and current signals that are obtained, the first torque profile or spectrum determined from a combination of plural harmonic order sinusoidal distributions of flux in virtual electric machines and representative of torques generated by the electrical machine, the plural harmonic order sinusoidal distributions of flux in the virtual electric machines and the non-sinusoidal distribution of flux in the electrical machine determined from the voltage and current signals that are obtained; and
- detecting a presence of an anomaly in the mechanical drive train based on the first torque profile or spectrum,
- responsive to detecting the presence of the anomaly advancing a shutdown process or maintenance of the electrical machine,
- wherein the harmonic order sinusoidal distributions of flux represent distributions of flux in the virtual electric machines that are connected to a common shaft,
- wherein each of the virtual electric machines has a different respective number of poles, each of the virtual electric machines has a rotor rotating at a common speed as rotors of the other virtual electric machines, and
- wherein the virtual electric machines produce flux linkage vectors having different respective electrical angular speeds.

18. The system of claim 17, wherein the first torque profile represents torque generated by the mechanical drive train as a function of crank angle in one or more cylinders of the mechanical drive train.

19. A method of monitoring health of a mechanical drive train, the method comprising:
- obtaining voltage and current signals from at least one phase of an electrical machine coupled with the mechanical drive train, wherein the voltage and current signals indicate a non-sinusoidal distribution of flux in the electrical machine;
- determining plural sinusoidal distributions of flux in plural virtual electric machines from the voltage and current signals;
- combining the plural sinusoidal distributions of flux in the virtual electric machines into a combination of the plural sinusoidal distributions of flux;
- generating a torque profile from the combination of the plural sinusoidal distributions of flux, the torque profile representing torque generated by the mechanical drive train as a function of crank angle in one or more cylinders of the mechanical drive train; and
- detecting a presence of an anomaly in the mechanical drive train based on the torque profile,
- responsive to detecting the presence of the anomaly advancing a shutdown process or maintenance of the electrical machine,
- wherein the harmonic order sinusoidal distributions of flux represent distributions of flux in the virtual electric machines that are connected to a common shaft,
- wherein each of the virtual electric machines has a different respective number of poles, each of the virtual electric machines has a rotor rotating at a common speed as rotors of the other virtual electric machines, and
- wherein the virtual electric machines produce flux linkage vectors having different respective electrical angular speeds.

* * * * *